(12) United States Patent
Jeran et al.

(10) Patent No.: US 7,221,473 B2
(45) Date of Patent: May 22, 2007

(54) PRINTING SYSTEM FOR UPDATING PRINTING CHARACTERISTICS WITH A PRINTING CONSUMABLE

(75) Inventors: Paul L Jeran, Boise, ID (US); Robert E. Haines, Boise, ID (US); Quintin T. Phillips, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 929 days.

(21) Appl. No.: 09/922,521

(22) Filed: Aug. 3, 2001

(65) Prior Publication Data

US 2003/0025939 A1 Feb. 6, 2003

(51) Int. Cl.
*B41B 27/28* (2006.01)
(52) U.S. Cl. ............... 358/1.16; 358/1.15; 347/12; 347/19; 347/214; 399/8; 399/25
(58) Field of Classification Search ............... 358/1.15, 358/1.16; 399/8, 25; 347/19, 85, 214, 12
See application file for complete search history.

(56) References Cited

U.S. PATENT DOCUMENTS

| | | | | |
|---|---|---|---|---|
| 4,829,326 A | * | 5/1989 | Emmett et al. | ............. 347/116 |
| 5,049,898 A | * | 9/1991 | Arthur et al. | ................. 347/19 |
| 5,835,817 A | * | 11/1998 | Bullock et al. | ............... 399/25 |
| 5,837,986 A | | 11/1998 | Bariel et al. | |
| 5,930,553 A | * | 7/1999 | Hirst et al. | ..................... 399/8 |
| 6,008,827 A | * | 12/1999 | Fotland | ...................... 347/120 |
| 6,155,664 A | * | 12/2000 | Cook | ............................. 347/7 |
| 6,351,317 B1 | * | 2/2002 | Sasaki et al. | .............. 358/1.15 |
| 6,467,888 B2 | * | 10/2002 | Wheeler et al. | .............. 347/85 |
| 6,522,348 B1 | * | 2/2003 | Brot et al. | ................... 347/214 |

FOREIGN PATENT DOCUMENTS

| | | |
|---|---|---|
| DE | 3752138 | 10/1994 |
| DE | 10042914 | 4/2001 |
| EP | 1070594 | 1/2001 |
| WO | WO00/19278 | 4/2000 |

* cited by examiner

*Primary Examiner*—Aung Moe
*Assistant Examiner*—Peter K. Huntsinger

(57) ABSTRACT

The flexible printing system is comprised of a printer that has printing characteristics that can be updated. A printer cartridge comprises printer data memory that either stores new printing characteristics or stores a location from the Internet from which these characteristics can be downloaded. The printer accesses the cartridge's printer data memory and checks the stored printing characteristics. If the printer can use these characteristics and they differ from the characteristics that are presently being used by the printer, the printer updates its printing characteristics using the printer data memory's printing characteristics. In one embodiment, the printer characteristics are color tables and dithering algorithms.

24 Claims, 7 Drawing Sheets

PRINTING SYSTEM FOR UPDATING PRINTING CHARACTERISTICS WITH A PRINTING CONSUMABLE

BACKGROUND OF THE INVENTION

Systems for printing involve trade-offs made by the manufacturer to achieve a solution that is acceptable for a majority of consumers. A printer manufacturer may have a variety of printer models, each focused on a different segment of consumers.

For example, a printer manufacturer may have one or more models that are focused on consumers wishing to print photographs that have been scanned-in or downloaded to a computer from a digital camera. The same manufacturer may also sell other printers that are color but are not marketed as photograph printers.

The different printers are typically focused on different markets and uses by storing the color tables, dithering algorithms, and print characteristics for different print media in the printer's memory. A printer that is being marketed as a photograph printer may have a different color table and dithering algorithm than, for example, a lower cost printer that is marketed towards an everyday printer for all uses.

The more models that a manufacturer offers, the greater their costs. The manufacturer must be able to support each model with technical support, sales staff training, and other costs associated with each printer.

Due to these costs, a printer manufacturer may be reluctant to enter a niche market if they do not anticipate enough sales to make the manufacturing and marketing costs for the niche printer worthwhile. This may reduce the competition available for printers in a niche market while also increasing the cost of the printers due to lack of demand.

An additional problem is that technology and materials are limited by what is available at the time of design and development of the printer. A certain color or print media that is desired by a large corporate customer may not be available when the printer is being designed and the color tables and dithering algorithms are burned into the printer's memory. The printer manufacturer must now redesign the printer to take those desired qualities into account. This results in more design costs, greater delay to market, and lost sales for the manufacturer. There is a resulting need for a more flexible printing system that can be updated rapidly and inexpensively to take into account changing markets and consumer desires.

SUMMARY OF THE INVENTION

The present invention encompasses a flexible printing system that has the ability to be updated from print data stored in memory that is part of a printer consumable. The printer is comprised of updateable printing characteristics. In one embodiment, these characteristics are stored in programmable memory in the printer. The printing characteristics include dithering algorithms and color tables. The printer additionally has a transfer mechanism such as an radio frequency identification (RFID) receiver or electrical contacts that mate with contacts on the printer consumable. If the printer is capable of using the data in the memory and the data is not the same as the data stored in the printer, the printer reads the data from memory and updates its own printing characteristics using the new data.

In another embodiment, printer data is stored in a separate printer data card that is coupled to the printer in some manner. The printer reads the data in the card either through an RFID mechanism or through contacts on the card.

DETAILED DESCRIPTION OF THE PREFERRED EMBODIMENT

The printer data cartridge apparatus of the present invention enables a printer manufacturer to design a printer that is updateable by the consumer. The apparatus provides the consumer with the ability to inexpensively change the print characteristics of the printer whenever the use of the printer is changed or when print characteristics technology changes.

In the preferred embodiment, the print characteristics of the present invention are the color tables and/or dithering algorithms required to perform a printing operation. These characteristics are downloaded or used by the printer, depending on the embodiment, typically by the consumer or printer user.

For purposes of clarity, the subsequent discussion of the present invention refers to a printer ink cartridge as used in an inkjet printer. However, it is understood that the printer data memory containing the print characteristics of the present invention can be incorporated into any printer consumable. An alternate embodiment also incorporates the data memory into a data card that is separate from the print consumable. The print consumable may be any portion of a printer that wears out over time and usage. For example, the print consumables may include the fuser, toner cartridge, drums, belts, or any other portion of the printer that can be replaced.

Figure 1:
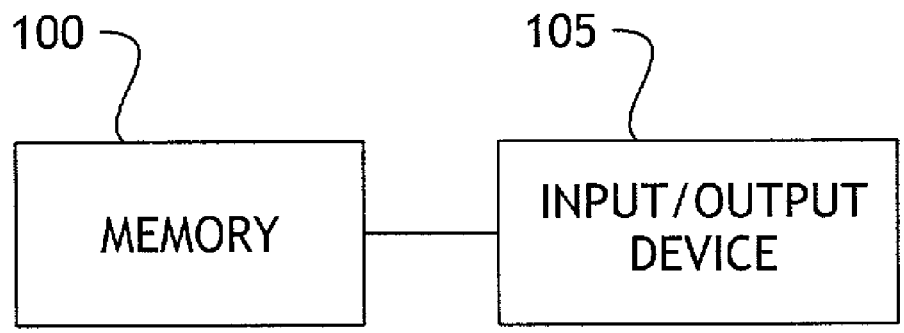
FIG. 1 shows a block diagram of the printer cartridge apparatus of the present invention.

FIG. 1 illustrates a block diagram of the memory (100) and input/output apparatus (105) incorporated into the printer cartridge apparatus of the present invention. For purposes of clarity, the remaining portions of the ink jet cartridge or the toner cartridge are not shown since they are well known in the art.

The memory (100) may be one of many types of memory available in the art. For example, the memory may be some form of read only memory (ROM), such as programmable read only memory (PROM) or electrically erasable PROM (EEPROM), or some type of flash memory. The capacity of the memory (100) is dictated by the amount of data that needs to be stored.

The input/output device (105), in the preferred embodiment, is an antenna that is inductively coupled to a card reader's antenna. This antenna and memory card operates using the radio frequency identification (RFID) standard to provide the information contained in the memory to a querying device. In the present invention, the querying device is the printer.

The operation of RFID is well known in the art. The printer cartridge incorporating the printer data memory is comprised of an antenna that is inductively coupled to the printer's antenna and reading device. The coupling induces a current in the memory card that enables the memory to operate and transmit its data out to the printer. The memory is typically comprised of serial electrically erasable programmable read only memory. However, the present invention encompasses any type of memory that can store the data required for proper operation.

In an alternate embodiment, the input/output device (105) is a set of contacts that mate with another set of contacts in the printer. The meeting of the two sets of contacts provides a pathway for the electrical signals from the printer to query the memory for the information and the memory to transfer the information to the printer.

While the preferred embodiment incorporates semiconductor memory in the card, alternate embodiments incorporate other forms of memory. One embodiment uses an optical card that incorporates optical memory similar to that used in CDs or CDROMs.

An optical card is comprised of a panel of laser sensitive material that is laminated on the card and used to store the printer data. The printer data is burned into the laminated material with a laser in substantially the same manner as a CD is burned. A low power laser incorporated in the printer reads the card. The optical card stores megabytes of data more economically than semiconductor memory.

In still another embodiment, the memory is in the form of a bar code on the printer card. The printer data is printed on the card in the form of bar codes that are well known in the art. These codes are then read off by a scanning mechanism present in the printer.

In yet another embodiment, the memory is in the form of magnetic memory such as a magnetic stripe on a card or a magnetic disk. The printer comprises a magnetic data reader that reads the printer data from the magnetic storage.

Figure 2:
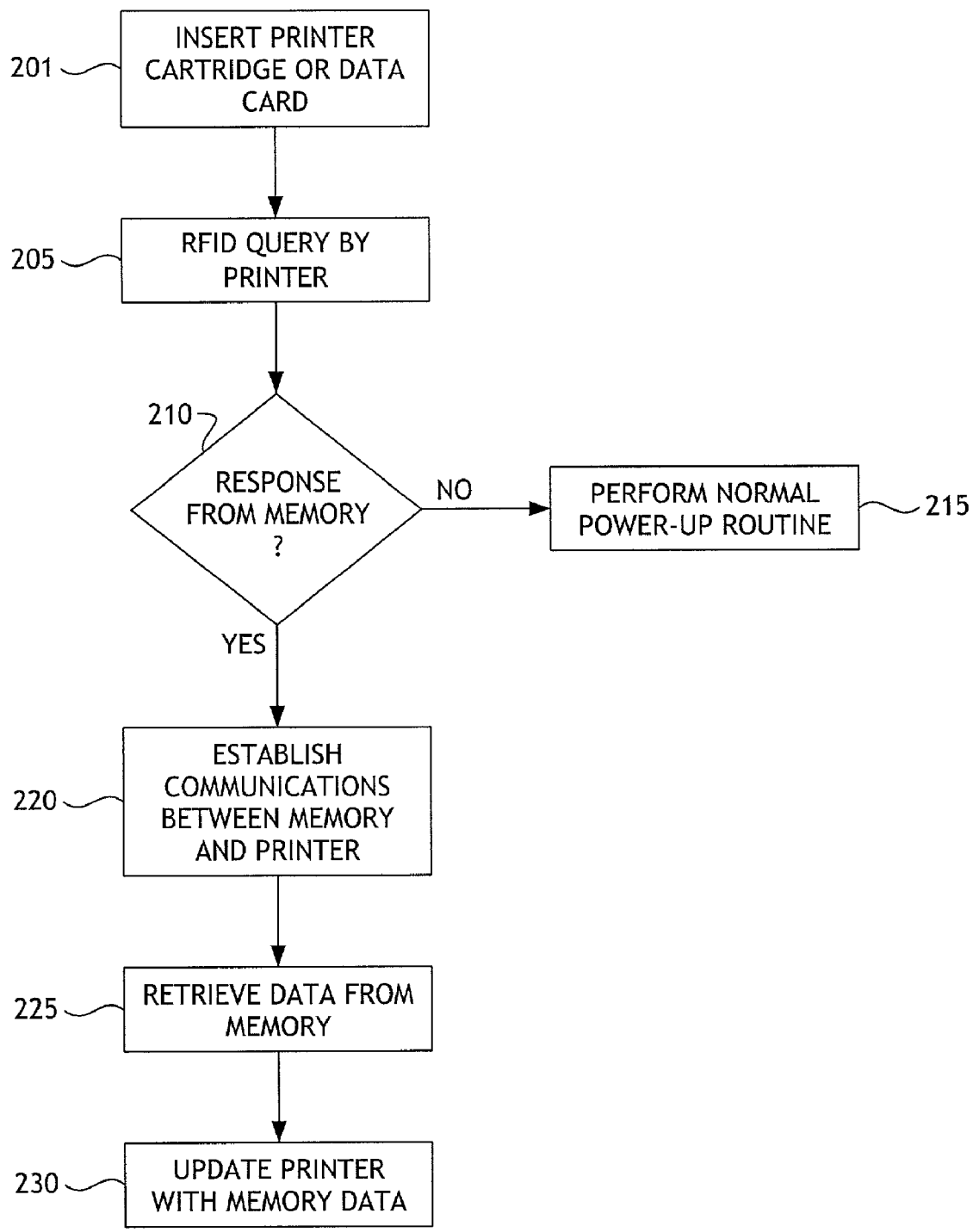
FIG. 2 shows a flowchart of the printer data download process of the present invention.

FIG. 2 illustrates a flowchart of the printer data transfer process of the present invention. The process begins with the insertion of the printer consumable, incorporating the printer data memory, into the printer (step 201).

If the alternate embodiment comprising a separate printer data card is employed, physical insertion of the card into a slot of the printer is not required. Whether the card is physically inserted depends on the technology used for the transfer of data from the card to the printer memory. For example, the RFID technology can read the card data when the card is simply brought into proximity to the printer transceiver. Optical cards or cards with contacts would require some kind of contact between the card and the printer in order to transfer the data.

The printer cartridge with the printer data memory or the printer card may be inserted into the printer either before or after the printer is powered up. If the cartridge or card is inserted before power-up of the printer, the printer's normal power-up routine would include checking for the presence of the cartridge or card. If they were inserted after the printer has already gone through its normal power-up routine, the cartridge or card must be capable of interrupting the printer or the printer must intermittently scan for the presence of a cartridge or card.

In one embodiment, if an RFID-type printer cartridge or card is brought within proximity of the printer, the printer's low-power transceiver that is periodically reading predetermined frequencies detects the cartridge or card and interrupts the printer's normal processes to instruct the printer to query the cartridge or card.

The printer then queries the cartridge or card (205) to determine the identification. If there is no response (step 210), the printer either returns to its normal processes or continues with its normal power-up routine (step 215). This would be the case when the cartridge or card is not compatible with the printer or the cartridge or card's memory contents are not compatible with the capabilities of the printer. For example, if the printer is a non-color laser printer and the data memory contains new color tables, the printer cannot use the information in the data memory.

If the cartridge or card responds to the printer's query (step 210), a communications link is established between the cartridge or card and the printer (step 220). The form of link depends on the type of cartridge or card being used. If RFID technology is used, as in the preferred embodiment, the transceiver of the printer performs any handshaking necessary to establish a data link with the printer data memory.

The printer then downloads the data in the memory (step 225). The download using the RFID process would occur over the wireless link, established previously, at a data rate that can be handled by both the printer and the printer cartridge or card of the present invention. In the preferred embodiment, the RFID transfer of data uses a 64 kbps transfer rate. In general, the higher the carrier frequency used by the system, the higher the data transfer rate achievable.

As the printer receives the data, it is temporarily stored in a buffer in the printer until it can be used by the printer controller to update the required printer data stored in printer memory. In one embodiment, the printer may download 1 k bytes of color table data into the buffer then write this data to the location in the printer's memory that contains the old color tables.

In an alternate embodiment, the printer is not manufactured with memory and the printer cartridge or card comprises the entire print characteristics of the printer. In such an embodiment, the printer cartridge or card comprises all of the color tables, dithering algorithms and other printer requirements normally stored in printer memory. An optical card would provide the megabytes of storage space necessary for such an embodiment.

Figure 3:
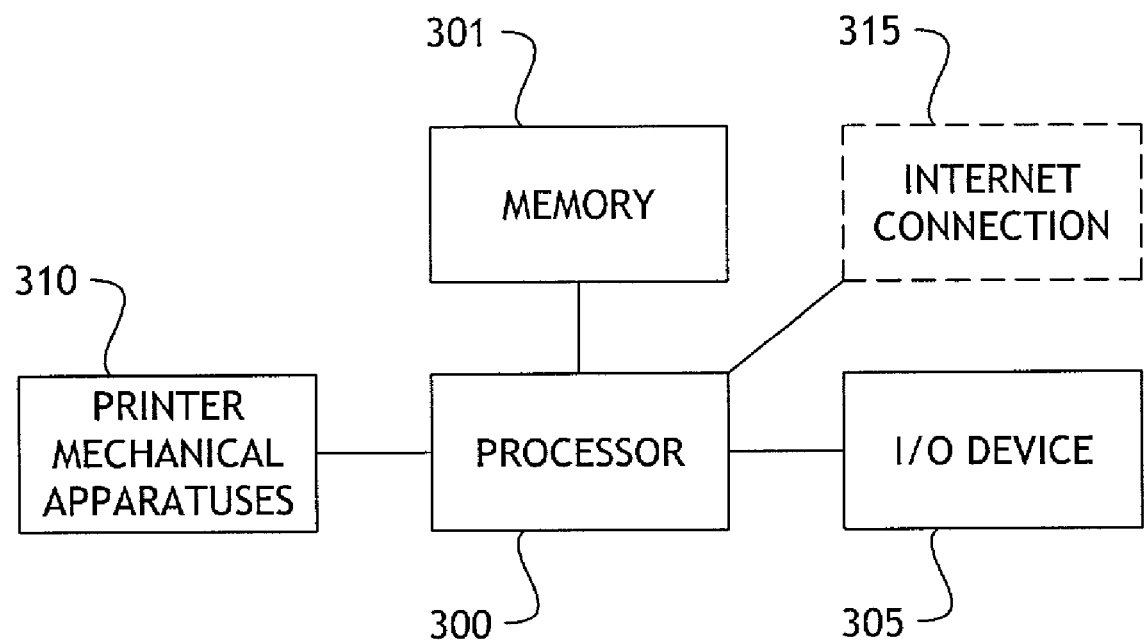
FIG. 3 shows a block diagram of a typical printer apparatus in accordance with the present invention.

FIG. 3 illustrates a block diagram of a printer incorporating the printer data card of the present invention. The printer is comprised of a processor (300) that controls the functions of the printer. The functions performed by the printer are stored in the printer memory (301). The memory incorporated in the printer may be ROM, PROM, flash memory, NVRAM, or any combination of these. For example, the printer's core functions for movement of the printer's ink cartridge would be stored in ROM while the color tables and dithering algorithms are stored in the programmable memory.

The printer's I/O device (305) is a transfer mechanism or card reader that is defined by the type of printer data cartridge or card used. If RFID technology is used, the I/O device is a low-power transceiver for communicating with the printer cartridge that is inserted into the cartridge holder. If a printer data card is used with optical technology or a bar code, the I/O device is a card reader comprising a laser reader or scanner.

In one embodiment, the printer comprises a connection to the Internet (315). This connection (315) may include a modem that allows the printer to access the Internet over the public switched telephone network (PSTN) to download various printing characteristics. In another embodiment, the Internet connection (315) is a computer coupled to the printer through a printer cable. In this embodiment, the computer has the connection to the Internet to give the printer the ability to access desired URLs.

The network connection of the present invention is not limited to the Internet. Any other type of network may be used to download the various printing characteristics.

Figure 4:
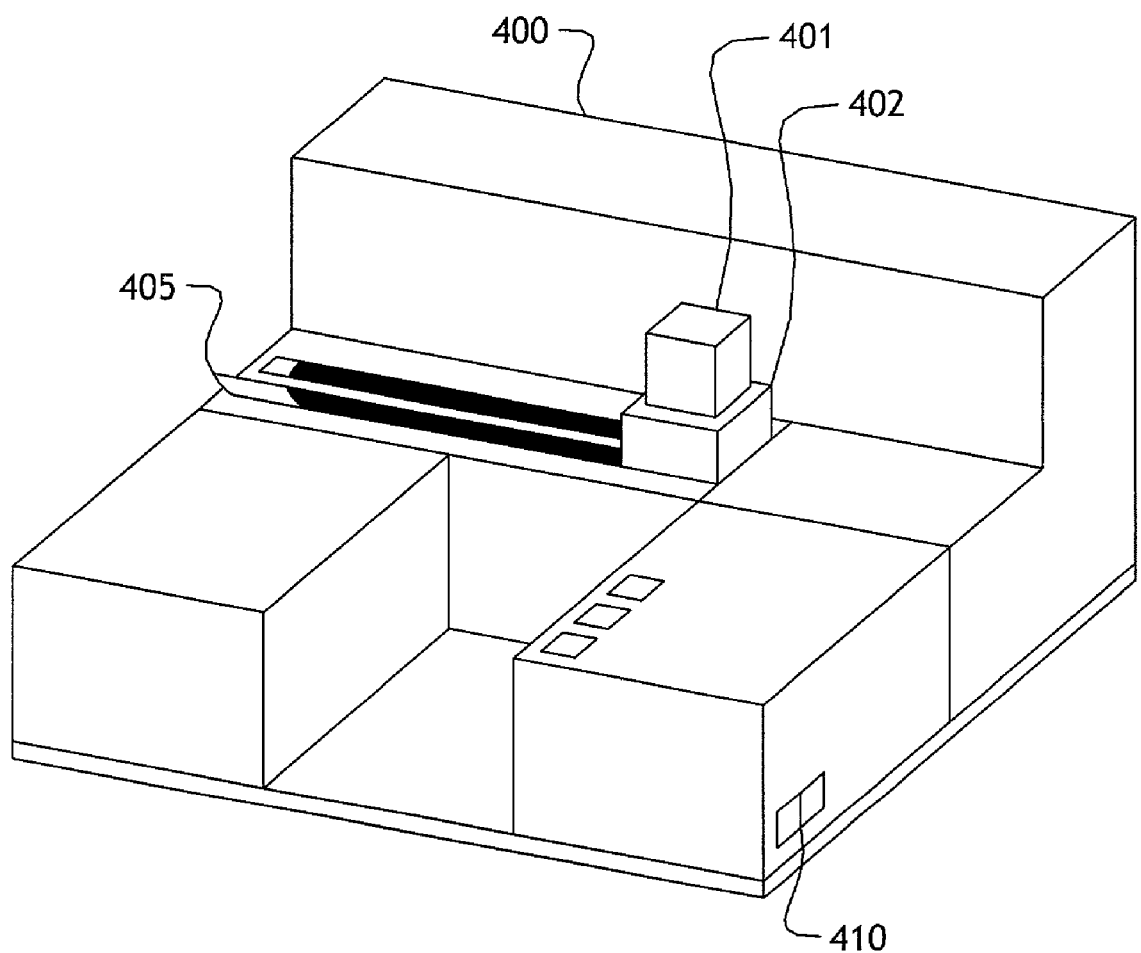
FIG. 4 shows a printer and printer cartridge having printer data memory in accordance with the present invention.

FIG. 4 illustrates a printer and printer inkjet cartridge with printer data memory in accordance with the present invention. The printer (400) can be any type of printing device. In the illustrated embodiment, the printer is an inkjet printer that produces text and graphics output on paper media. Other embodiments may include a laser printer, a bubble jet printer, or any other type of printing device.

The printer (400) is comprised of a power switch (410) for activating power to the printer. In the preferred embodiment, the printer data memory is included in the printer cartridge (401) that is installed in the printer cartridge carrier (402) of the printer (400). If contact is required between the cartridge (401) and the printer (400), contacts are provided on the printer cartridge (401) and the cartridge carrier (402) in order to transfer the data from the memory to the printer's memory.

Figure 5:
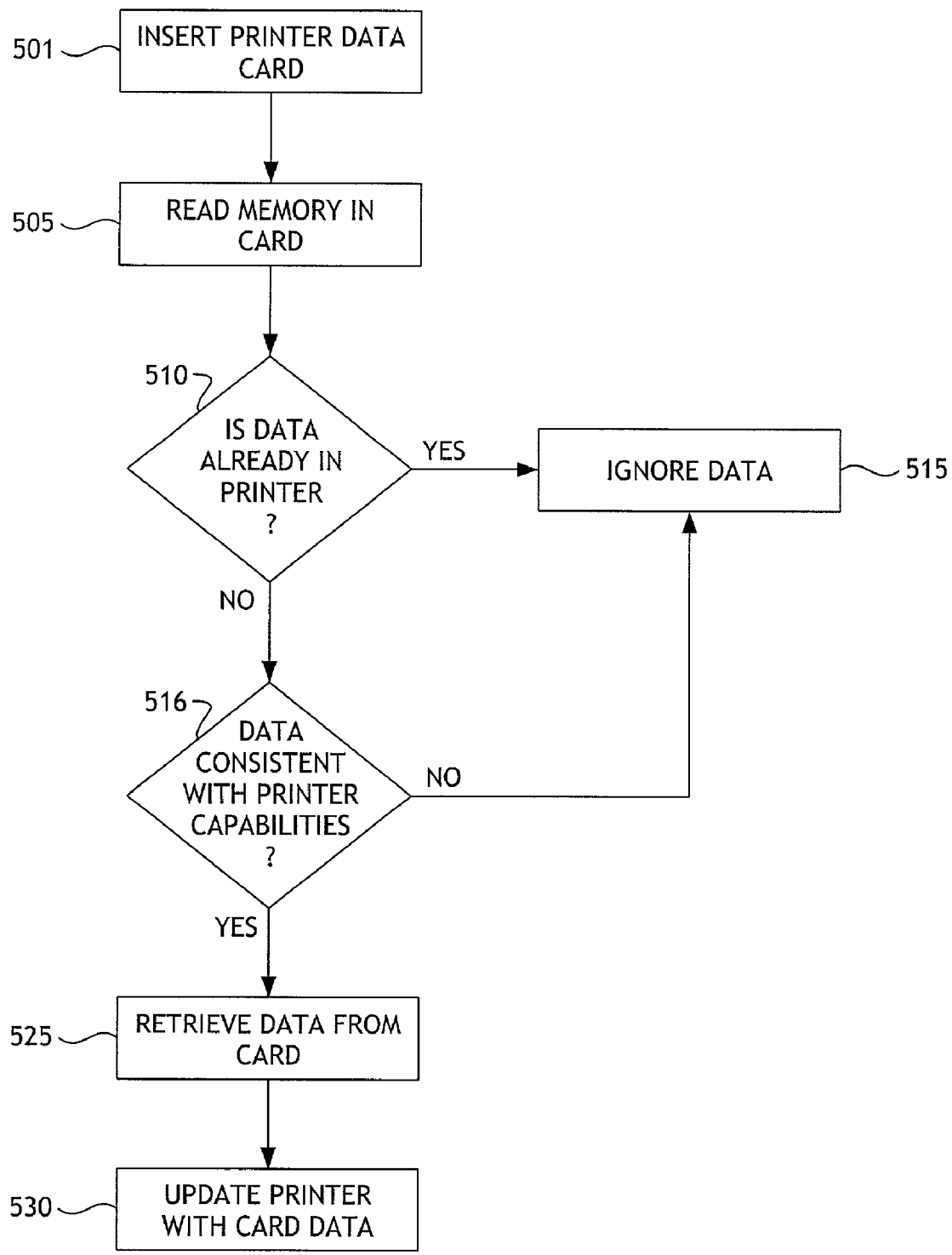
FIG. 5 shows a flowchart of an alternate embodiment process of the present invention incorporating an alternate technology printer data card.

FIG. 5 illustrates a flowchart of an alternate embodiment process for transferring data from an optical or bar code type printer data card. This process typically requires some kind of contact between the printer and the card. In this case, the card is inserted into the printer or a card reader mechanism (step 501) that may be separate from the printer but coupled to the printer by a wired or wireless link.

The printer detects the presence of the card either at power-up or by an interrupt mechanism provided by the card reader. The printer's controller then reads the data from the card (step 505). If this data is the same as that stored in the printer (step 510), the printer ignores the data (step 515).

The data is then checked to determine if it is compatible with the printing capabilities of the printer (step 516). For example, if the print data card comprises color tables and the printer is a non-color printer, the data cannot be used by the printer and is therefore ignored (step 515).

If the printer is able to use the data stored on the card (step 516), the printer's processor downloads the data from the card (step 525). The data is used to update the print characteristic data stored in the printer (step 530).

Figure 6:
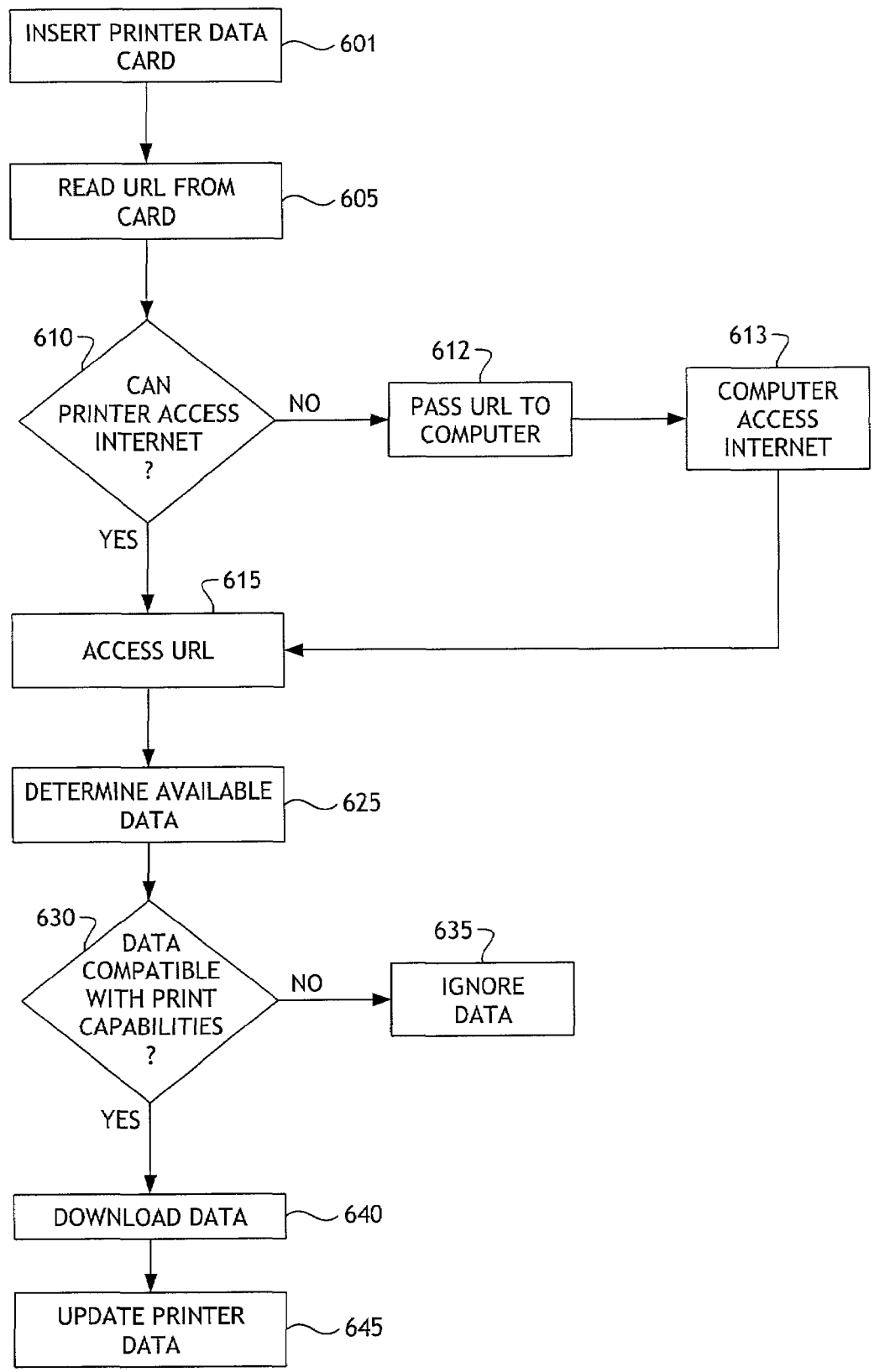
FIG. 6 shows a flowchart of yet another alternate embodiment process of the present invention incorporating a URL stored in the printer cartridge memory or the printer data card.

FIG. 6 illustrates a flowchart of yet another alternate embodiment process of the present invention. This embodiment stores a URL on the printer data card that enables the printer to access the designated World Wide Web site to download the required information (e.g., dithering algorithm, color tables).

The card is inserted or brought within proximity of the printer (step 601), depending on the card technology. The printer then reads the URL off the card (step 605). If the printer is capable of interfacing to the Internet (step 610) (i.e., Internet Service Provider or direct connection), the printer accesses the desired URL (step 615). If the printer is not capable of accessing the Internet (step 610), the printer passes the URL to a computer (step 612) that is coupled to the printer. The computer then automatically accesses the Internet (step 613) to locate the URL (step 615).

Once the URL has been accessed, the printer determines the type of data that is downloadable from the Web site (step 625). If the data is not compatible with the printing capabilities of the printer (step 630), the data is ignored and the printer resumes its normal routines (step 635).

If the data is compatible with the printing capabilities of the printer (step 630), the data is downloaded from the Web site (step 640). As in previous embodiments, this data can include dithering algorithms, color tables, or other print characteristics that are desired to be updated or changed in the printer.

Once the data is downloaded, the printer's processor uses the new data to update the required data already stored in memory (step 645). The new data may be stored permanently in place of the old printing data or the new data may be stored temporarily in volatile or non-volatile memory to be accessed only during predetermined print jobs.

In the embodiment of FIG. 6, if a network other than the Internet is used to access additional print characteristics, another access mechanism other than a URL may be implemented in the memory. For example, an Ethernet address or an identification number may be used.

Figure 7:
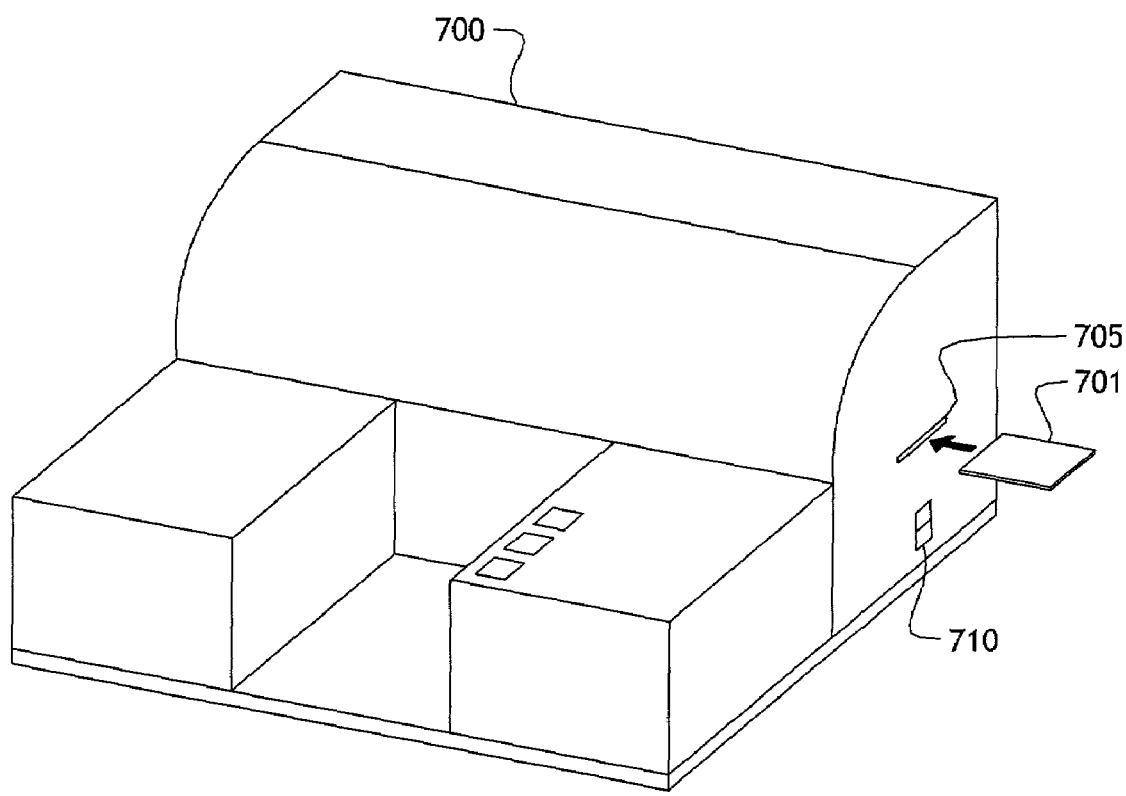
FIG. 7 shows an alternate embodiment printer and printer data card apparatus in accordance with the present invention.

FIG. 7 illustrates a printer and printer data card with data memory in accordance with the present invention. The printer (700) can be any type of printing device. In the illustrated embodiment, the printer is an inkjet printer that produces text and graphics output on paper media. Other embodiments may include a laser printer, a bubble jet printer, or any other type of printing device.

The printer (700) is comprised of a power switch (710) for activating power to the printer. In one embodiment, a slot in the side of the printer (705) is provided to accept the printer data card (701) of the present invention. If contact is required between the card and the printer, the printer data card (701) is inserted into the slot (705) in order to transfer the data from the memory in the card (701) to the printer's memory.

In an alternate embodiment, the printer card of the present invention may be a "smart card" that incorporates a controller or processor of some kind. In this case, the card would typically require more power for operation than a card with just memory. However, the addition of the processor would enable the printer to offload some of the processing work normally done by the printer's controller. This would allow the printer to be made less expensive by requiring the card's controller to perform the transfer of data to the printer's memory.

Additionally, a smart printer data card could be used to track printer consumables used by the printer and the rate at which they are used. The card could then generate a message to be displayed on the printer or computer that new consumables need to be ordered. The card could then automatically order the required consumables from over the Internet.

While the above embodiments use dithering algorithms and color tables as examples of printer characteristics that can be updated by the printer data card of the present invention, numerous other characteristics are updateable by the present invention. For example, the printer data memory can hold the characteristics to enable the printer to optimize printing of different media such as transparencies, checks, labels, and envelopes. The printer data memory can hold different print parameters for printing boundaries on different media, various fonts and font sizes, or any other printer characteristic that a printer requires in order to optimize printing.

In one embodiment, the printer data memory of the present invention can update the toner set in an already released product without having to worry about maintaining the same colorant set. The present invention enables custom colorant sets to be used in the printer for specific markets. For example, a sepia toner could be used to generate more realistic "old time" photo prints. Custom toners could be used in special applications such as toners for transparencies only.

The present invention additionally provides the ability to use the same printer for either 4-color printing or 3-color printing with a clear toner overcoat of the printed media for preservation purposes. The present invention could also trigger an automatic update of the printer dithers from the Internet based on the printer consumables used.

The present invention also provides the ability to use the same printer to provide different finishes to a print. For example, the fixing unit may be used to give a matte finish, a semi-glossy finish, a glossy finish, or any other type of finish. If a printer's fixing unit is set up to do only a matte finish with the default printer characteristics, new printer characteristics can be loaded to allow the printer to perform any other type of finishing parameter.

Numerous modifications and variations of the present invention are possible in light of the above teachings. It is therefore to be understood that within the scope of the appended claims, the invention may be practiced otherwise than as specifically described herein.

What is claimed is:

1. A flexible printing system comprising:
a printer comprising memory that stores a set of updateable print characteristics and a print characteristics transfer mechanism; and
a printer consumable comprising memory that stores a set of print characteristics, the printer consumable coupled to the print characteristics transfer mechanism in order to update the set of updateable print characteristics in the printer memory if the print characteristics are compatible with the printing capabilities of the printer, wherein the updateable characteristics include finishing processes, wherein the updateable characteristics include a dithering algorithm.

2. The system of claim 1 wherein the memory comprises semiconductor memory and the transfer mechanism comprises a radio frequency receiver that transfers the set of print characteristics from the memory over a radio frequency link.

3. The system of claim 1 wherein the memory comprises optical memory and the transfer mechanism comprises a laser for reading the optical memory.

4. The system of claim 1 wherein the memory comprises semiconductor memory and the transfer mechanism comprises electrical contacts that transfer electrical signals from the memory to the printer.

5. The system of claim 1 wherein the memory comprises magnetic memory and the transfer mechanism comprises a magnetic data reader for reading the magnetic memory.

6. The system of claim 1 wherein the memory comprises a bar code and the transfer mechanism comprises a laser scanner that scans the bar code and transfers the scanned data to the printer.

7. The system of claim 1 wherein the updateable print characteristics are replaced by the print characteristics stored in the print consumable memory.

8. The system of claim 1 wherein the finishing processes include a matte finish, a glossy finish, a satin finish, and finishes with varied surface roughness.

9. A flexible printing system comprising:
a printer comprising memory that stores a set of updateable print characteristics and a print characteristics transfer mechanism; and
a printer consumable comprising memory that stores a set of print characteristics, the printer consumable coupled to the print characteristics transfer mechanism in order to update the set of updateable print characteristics in the printer memory if the print characteristics are compatible with the printing capabilities of the printer, wherein the updateable characteristics include color tables.

10. A flexible printing system comprising:
a printer comprising:
programmable memory that stores updateable print characteristics after making a determination that the print characteristics are compatible with the printing capabilities of the printer; and
a radio frequency receiver; and
a printer consumable comprising memory that stores a set of printer characteristics and a radio frequency transmitter that transmits the printer characteristics to the radio frequency receiver, wherein the updateable characteristics include finishing processes and at least one of a dithering algorithm and a color table.

11. A method for updating printing characteristics in a printing system comprising a printer having radio frequency identification capability and a first set of printing characteristics and printer data memory that stores a second set of printing characteristics, the method comprising the steps of:
the printer querying the printer data memory;
when the printer data memory responds, the printer retrieving the second set of printing characteristics from the printer data memory over a radio frequency link; and
updating the printer with the second set of printing characteristics after making a determination that the print characteristics are compatible with the printing capabilities of the printer, wherein the second set of printing characteristics includes finishing parameters and at least one of a dithering algorithm and a color table.

12. The method of claim 11 and further including the step of if the first set and the second set of printing characteristics are substantially equivalent, the printer using the first set of printing characteristics.

13. The method of claim 11 and further including the step of if the second set of printing characteristics is incompatible with capabilities of the printer, the printer using the first set of printing characteristics.

14. A method for updating printing characteristics in a printing system comprising a printer having a card reader and a first set of printing characteristics and a data card that stores a second set of printing characteristics, the method comprising the steps of:
coupling the data card to the card reader;
the printer reading the second set of printing characteristics from the data card;
if the second set of printing characteristics are different from the first set of printing characteristics, the printer retrieving the second set of printing characteristics from the data card; and
if the second set of printing characteristics are compatible with printing capabilities of the printer, updating the first set of printing characteristics with the second set of printing characteristics, wherein the second set of printing characteristics include finishing processes and at least one of a dithering algorithm and a color table.

15. A method for updating printing characteristics in a printing system comprising a printer having a card reader and a first set of printing characteristics and a data card that stores a second set of printing characteristics, the method comprising the steps of:

coupling the data card to the card reader;
the printer reading the second set of printing characteristics from the data card;
if the second set of printing characteristics are different from the first set of printing characteristics and the printer is capable of using the printing characteristics, the printer retrieving the second set of printing characteristics from the data card; and
if the second set of printing characteristics are compatible with printing capabilities of the printer, updating the first set of printing characteristics with the second set of printing characteristics, wherein the second set of printing characteristics include finishing processes and at least one of a dithering algorithm and a color table.

16. A flexible printing system comprising:
a printer comprising:
  memory that stores updateable printing characteristics, wherein the updateable printing characteristics include finishing processes and at least one of a dithering algorithm and a color table; and
  a print characteristics transfer mechanism;
a network connection that enables the printer to access a network; and
a printer data memory that stores a uniform resource locator, the printer data memory coupled to the print characteristics transfer mechanism in order to transfer the uniform resource locator to the printer, wherein the printer is configured to download data from a web site corresponding to the URL if the data is compatible with printing capabilities of the printer, wherein the data is used to update the updateable printing characteristics.

17. The system of claim 16 wherein the network connection comprises a modem that is coupled to the public switched telephone network.

18. The system of claim 16 wherein the network connection comprises a computer having Internet access capabilities.

19. The system of claim 16 wherein the network is the Internet.

20. A method for updating printing characteristics in a printing system comprising a printer having a card reader, network access capability, and a first set of printing characteristics, the system further comprising a data card that stores a network identification of a location on a network, the method comprising the steps of:
coupling the data card to the card reader;
the printer reading the network identification from the data card
accessing the network identification over the network;
accessing a second set of printing characteristics at the network location designated by the network identification;
if the second set of printing characteristics is different from the first set of printing characteristics and the printer is capable of using the second set of printing characteristics, the printer retrieving the second set of printing characteristics from the network location; and
if the second set of printing characteristics are compatible with printing capabilities of the printer, updating the first set of printing characteristics in response to the second set of printing characteristics, wherein the second set of printing characteristics include finishing processes.

21. The method of claim 20 wherein the step of accessing the network identification over the network includes accessing a uniform resource locator through a computer coupled to the printer.

22. A printer cartridge apparatus having a capability for printing on media and updating printing characteristics of a printer, the apparatus comprising:
memory that stores printing characteristics for use by the printer;
means for transferring the printing characteristics to the printer, the means coupled to the memory, wherein the printer is configured to update printing characteristics of the printer with printing characteristics of the printer cartridge apparatus if the printing characteristics of the printer cartridge apparatus is compatible with printing capabilities of the printer; and
means for printing on the media, wherein the printing characteristics include finishing parameters and a dithering algorithm.

23. The apparatus of claim 22 wherein the printing characteristics further include a color table.

24. A printer cartridge apparatus having a capability for printing on media and updating printing characteristics of a printer, the apparatus comprising:
memory that stores printing characteristics for use by the printer;
means for transferring the printing characteristics to the printer, the means coupled to the memory, wherein the printer is configured to update printing characteristics of the printer with printing characteristics of the printer cartridge apparatus if the printing characteristics of the printer cartridge apparatus is compatible with printing capabilities of the printer; and
means for printing on the media, wherein the printing characteristics include finishing parameters and a color table.

* * * * *

UNITED STATES PATENT AND TRADEMARK OFFICE
CERTIFICATE OF CORRECTION

| | |
|---|---|
| PATENT NO. | : 7,221,473 B2 |
| APPLICATION NO. | : 09/922521 |
| DATED | : May 22, 2007 |
| INVENTOR(S) | : Paul L Jeran et al. |

Page 1 of 1

It is certified that error appears in the above-identified patent and that said Letters Patent is hereby corrected as shown below:

In column 9, line 48, in Claim 20, after "data card" insert -- ; --.

Signed and Sealed this

Fourth Day of August, 2009

JOHN DOLL
*Acting Director of the United States Patent and Trademark Office*